United States Patent [19]
Naslund

[11] 3,789,705
[45] Feb. 5, 1974

[54] TOOL FOR MOUNTING AND DISMOUNTING A BOLTED UNION

[76] Inventor: Bengt Roland Naslund, Snappvagen 16, 190 60 Balsta, Sweden

[22] Filed: Mar. 24, 1972

[21] Appl. No.: 237,624

[30] Foreign Application Priority Data
Mar. 29, 1971 Sweden.............................. 4017/71

[52] U.S. Cl. ................................................. 81/13
[51] Int. Cl.......................................... B25b 23/08
[58] Field of Search.............. 81/13, 3 F, 55; 29/240

[56] References Cited
UNITED STATES PATENTS
3,394,623   7/1968   Kinakin................................ 81/55
2,007,432   7/1935   Mancuso............................. 81/3 F
FOREIGN PATENTS OR APPLICATIONS
1,020,940   11/1952   France................................. 81/3 F

*Primary Examiner*—James L. Jones, Jr
*Assistant Examiner*—Roscoe V. Parker
*Attorney, Agent, or Firm*—Karl W. Flocks

[57] ABSTRACT

A tool for mounting and dismounting a bolted union comprising a nut and a bolt consists of a spanner which serves to screw the nut onto the bolt and unscrew it therefrom, and of a pin of unround cross section mounted for rotation in the spanner and adapted to engage in a central bore of conforming cross section formed in the free bolt end which cooperates with the nut. The pin mounted for rotation in the spanner and having unround cross section is longitudinally movable within broad limits in the spanner and the pin which has a handle for permitting rotation thereof in relation to the spanner cooperates with a spring mechanism which tends to urge the pin downwards to the position to be occupied by the nut in the spanner.

A bolt which is for use in the bolted union and adapted to be operated by the tool has a central hexagon bore formed in its free end.

3 Claims, 5 Drawing Figures

TOOL FOR MOUNTING AND DISMOUNTING A BOLTED UNION

This invention relates to a tool for mounting and dismounting a bolted union comprising a nut and a bolt, said tool consisting of a spanner serving to screw the nut onto the bolt and to unscrew it therefrom, and of a pin of unround cross section mounted for rotation in the spanner and adapted to engage in a central bore of conforming cross section formed in the free bolt end which cooperates with the nut. According to the invention, the pin of unround cross section which is mounted for rotation in the spanner is longitudinally movable within broad limits in said spanner and cooperates with a spring mechanism which tends to urge the pin downwards to the position to be occupied by the nut in said spanner, and the pin has a handwheel for its rotation in relation to the spanner. On account of its movability the pin during the entire mounting and dismounting operation is sure to take part in the movement of the bolt in relation to the nut with the pin end snugly engaged in the unround central bore of the bolt. The spring mechanism cooperating with the pin ensures a reliable engagement between the pin end and the unround central bore of the bolt, and simultaneously said mechanism tends to urge the nut of the bolted union into engagement with the united parts. The handwheel of the pin is an extremely simple operating means ensuring a simple and reliable use of the tool.

The invention is also concerned with a bolt for coaction with the tool when the pin having the unround cross section is a hexagon box spanner. According to the invention, said bolt is formed in its free end with a central hexagon bore in which the hexagon box spanner is to engage with its pin at the mounting and dismounting of the bolted union. Within broad limits for the size of the bolt said hexagon bore shall have the same dimension to permit using the same hexagon box spanner in a great many different connections.

The invention will now be more fully described hereinbelow with reference to the accompanying drawings which illustrate an embodiment of the tool chosen by way of example, and a bolt with pertaining nut for said tool.

Figure 1:
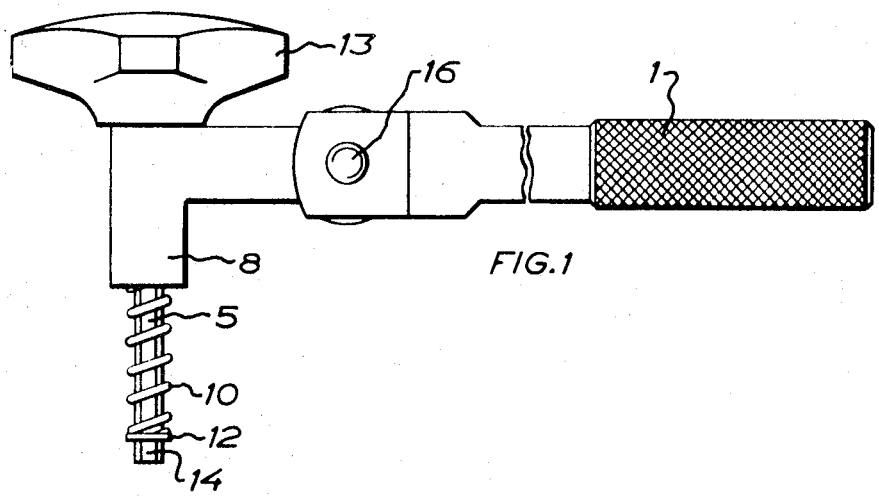
FIGS. 1 and 2 are side views of the constituent parts of the tool.
Figure 2:
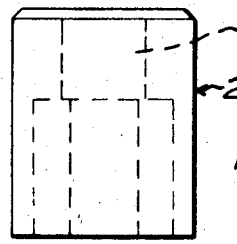
Figure 3:
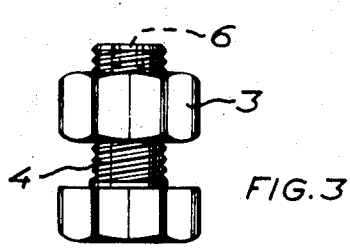
FIG. 3 is a side view of the bolt and the nut.

As will appear from the drawings the tool consists of a spanner 2 having a handle 1 for screwing the nut 3 onto and unscrewing it from the bolt 4, and of a pin 5 of unround section mounted for rotation in the spanner and adapted to engage in a central bore 6 formed in the free end of the bolt 4 remote from the head thereof. The central bore 6 is of a section conforming to that of the pin. The spanner 2 more particularly comprises a hexagon box conformed to the nut 3 and having a square hole 7 for accommodating an arm 8 extending at right angles from and integral with the handle 1, said arm having the same cross section as said hole 7. The arm 8 is formed with a central bore 9 for the pin 5 of the hexagon box spanner, said pin 5 being mounted for rotation in said bore 9.

Figure 4:
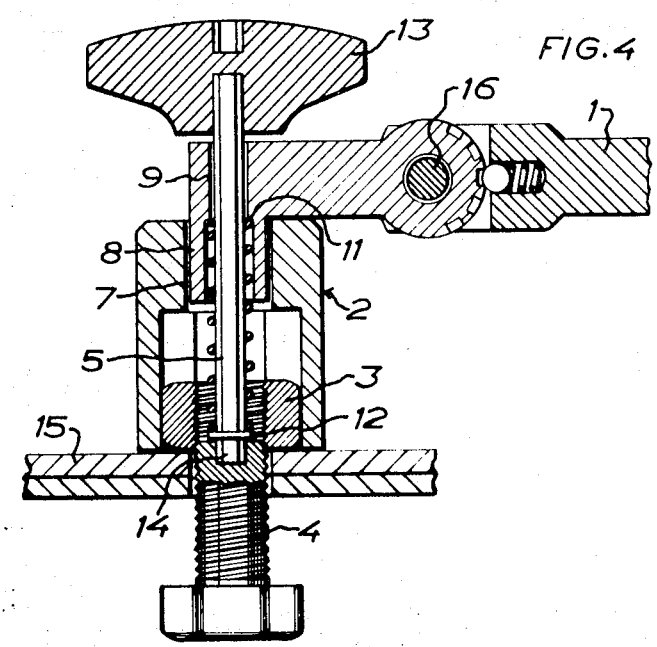
FIG. 4 is a longitudinal section of the tool at the beginning of an operation for mounting a bolted union.
Figure 5:
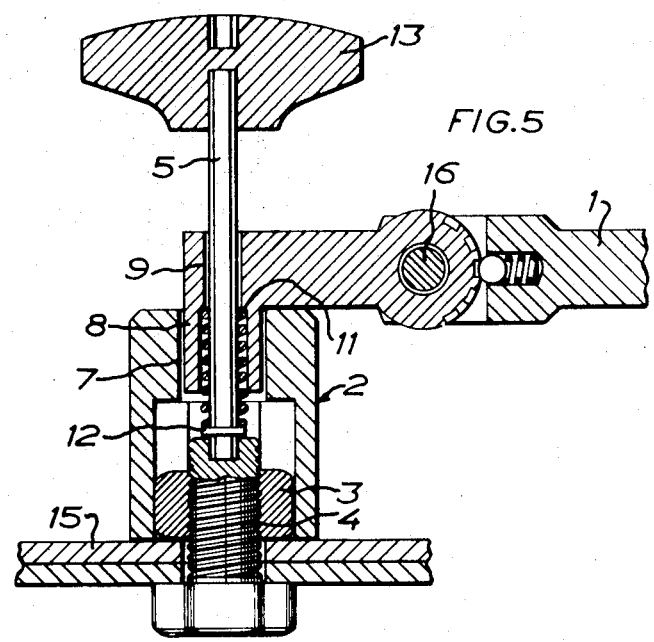
FIG. 5 is a longitudinal section of the same parts but at the end of the operation for mounting the bolted union.

According to the invention, the pin 5 of the hexagon box spanner is longitudinally movable within broad limits in the hexagon box 2, as will appear from a comparison between FIGS. 4 and 5. The pin 5 can thus take part in the entire axial movement of the bolt 4 at the mounting. The pin 5 co-acts with a spring mechanism 10 which tends to urge the pin downwards to the position to be occupied by the nut 3 in the hexagon box 2. The spring mechanism 10 is a coil spring which is wound about the pin 5 and has its one end in bearing engagement with an abutment 11 in the central bore 9, while the other end thereof is in bearing engagement with an abutment 12 formed on the pin 5. Said abutment 12 is arranged at a distance from the end of the pin 5 which is substantially equally large as the hexagon pin 5 in the bolt 4 is deep so that in the mounting operation the pin 5 can always reach the bottom in the bore 6. The pin 5 has a handwheel 13 attached thereto for permitting rotation of the pin 5 relative to the hexagon box 2. Either the hexagon box 2 is rotated by means of the handle 1 while the pin 5 is maintained stationary with the handwheel 13, or the pin 5 is rotated by means of the handwheel 13 while the hexagon box 2 is maintained stationary by means of the handle 1.

As will appear from the drawing the pin 5 is of such a length as to reach with its free end 14 all the way into the hexagon bore 6 of the bolt 4 when the nut 3 is screwed onto the bolt by less than one turn. The pin 5 can then take part in the axial movement of the bolt 4 to a position in which the abutment 12 bears against the end of the arm 8.

When the bolted union is mounted the bolt 4 is passed with its free end through the part or parts 15, whereupon the nut 3 is manually screwed onto the bolt by approximately one turn. The tool is then caused to engage the bolted union, the hexagon box 2 grasping the nut 3 engaging the part 15 while the pin 5 of the hexagon box spanner is caused to engage in the hexagon bore 6 formed in the bolt 4. The operator with his one hand retains the hexagon box 2 by means of the handle 1 while he rotates the pin 5 with his other hand which grasps the handwheel 13. This rotation is completed to the final position illustrated in FIG. 5 in which the final tightening is brought about with the aid of the handle 1 which actuates the nut 3 over the hexagon box 2.

By rotating the bolt 4 by means of the pin 5 between the positions shown in FIGS. 4 and 5 the threads formed on the bolt 4 are not subjected to any upsetting action from the parts 15, as would have been the case if the bolt 4 had been passed through the parts 15 without being rotated.

16 designates a ball and socket joint on the handle 1, by which the handle can be adjusted into various angular positons.

I claim:

1. A tool for mounting and dismounting a bolted union comprising a nut (3) and a bolt (4), said tool consisting of a hexagon box spanner (2) with a handle and an open lower end for reception of said nut and an end of said bolt to screw the nut (3) onto the bolt (4) and to unscrew it therefrom, and a pin (5) of continuous unround cross-section mounted for rotation in the spanner (2) and adapted to engage in a central bore (6) of conforming cross-section formed in the free end of the bolt (4) which cooperates with the nut (3), said pin (5) being provided with an operating means (13) for rotating the pin relative to the spanner, wherein the pin (5) of unround cross-section which is mounted for rotation in the spanner (2) is movable so far in its longitudinal direction of the spanner (2) through a horizontal plane defining said open lower end of said spanner so that the pin (5) can follow the bolt (4) during the entire movement thereof in relation to the nut (3) when said nut is screwed onto the bolt and unscrewed therefrom, and the pin (5) cooperates with a spring mechanism (10) which tends to urge the pin downwards to the position occupied by the nut (3) in the spanner (2), said pin (5) in the lowermost position reaching the open end of the spanner (2).

2. A tool as claimed in claim 1, wherein the pin of unround cross section is part of a hexagon box spanner.

3. A bolt for use in a bolted union and adapted to be operated by the tool defined in claim 2, said bolt having a shallow central hexagon bore, in which said pin may be continuously seated during operation of said tool, formed in its free end.

\* \* \* \* \*